US012253284B2

(12) United States Patent
Neal et al.

(10) Patent No.: US 12,253,284 B2
(45) Date of Patent: Mar. 18, 2025

(54) SYSTEMS AND METHODS FOR OPERATING A FURNACE

(71) Applicant: Trane International Inc., Davidson, NC (US)

(72) Inventors: James R. M. Neal, Tyler, TX (US); Thomas Gort, Tyler, TX (US); Wayne N. Kraft, Tyler, TX (US); Sandeep Gowdagiri, Tyler, TX (US); Neal Harrington, Tyler, TX (US); David Williams, Jr., Tyler, TX (US)

(73) Assignee: Trane International Inc., Davidson, NC (US)

( * ) Notice: Subject to any disclaimer, the term of this patent is extended or adjusted under 35 U.S.C. 154(b) by 0 days.

(21) Appl. No.: 18/181,292

(22) Filed: Mar. 9, 2023

(65) Prior Publication Data

US 2023/0213240 A1    Jul. 6, 2023

Related U.S. Application Data

(63) Continuation of application No. 16/926,403, filed on Jul. 10, 2020, now Pat. No. 11,624,529.

(51) Int. Cl.
*F24H 9/20* (2022.01)
*F24D 19/10* (2006.01)
(Continued)

(52) U.S. Cl.
CPC ....... *F24H 9/2085* (2013.01); *F24D 19/1084* (2013.01); *F23D 14/02* (2013.01);
(Continued)

(58) Field of Classification Search
CPC ........... F23D 14/02; F23J 15/06; F23N 3/002; F23N 3/082; F23N 5/242; F23N 2231/26; F23N 2231/08; F23N 2231/10; F23N 2241/02; F24D 5/02; F24D 19/1084; F24D 2220/06; F24H 9/2085; Y02B 30/70; Y02E 20/30
(Continued)

(56) References Cited

U.S. PATENT DOCUMENTS

| 4,706,881 A | 11/1987 | Ballard |
| 6,719,207 B2 | 4/2004 | Kloster |

(Continued)

*Primary Examiner* — Steven B McAllister
*Assistant Examiner* — Benjamin W Johnson
(74) *Attorney, Agent, or Firm* — Womble Bond Dickinson (US) LLP

(57) ABSTRACT

Methods and related systems for operating a furnace are disclosed. In an embodiment, the method includes activating a burner assembly and a first fan of the furnace to combust fuel and air and circulate combustion gases along a flow path extending through a heat exchanger of the furnace. In addition, the method includes operating a second fan of the furnace to circulate air across an external surface of the heat exchanger of the furnace and produce a conditioned airflow. Further, the method includes monitoring one or more parameters of a motor of the second fan indicative of an airflow rate of the conditioned airflow, and deactivating the burner assembly, whereby combustion of the fuel and air in the furnace ceases, in response to the one or more parameters indicating that the airflow rate is less than a minimum airflow rate.

20 Claims, 5 Drawing Sheets

(51) Int. Cl.
*F23D 14/02* (2006.01)
*F23J 15/06* (2006.01)
*F23N 3/00* (2006.01)
*F23N 3/08* (2006.01)
*F23N 5/24* (2006.01)
*F24D 5/02* (2006.01)

(52) U.S. Cl.
CPC .............. *F23J 15/06* (2013.01); *F23N 3/002* (2013.01); *F23N 3/082* (2013.01); *F23N 5/242* (2013.01); *F23N 2231/26* (2020.01); *F23N 2233/08* (2020.01); *F23N 2233/10* (2020.01); *F23N 2241/02* (2020.01); *F24D 5/02* (2013.01); *F24D 2220/06* (2013.01); *Y02B 30/70* (2013.01); *Y02E 20/30* (2013.01)

(58) Field of Classification Search
USPC ...................................................... 126/116 A
See application file for complete search history.

(56) References Cited

U.S. PATENT DOCUMENTS

| | | | |
|---|---|---|---|
| 8,286,594 | B2 | 10/2012 | Smelcer |
| 8,660,708 | B2* | 2/2014 | Narayanamurthy ........................ G05D 23/1924 700/299 |
| 10,094,593 | B2 | 10/2018 | Chian et al. |
| 10,451,303 | B1 | 10/2019 | Jasteh |
| 2004/0043345 | A1 | 3/2004 | Jaeschke |
| 2004/0250810 | A1* | 12/2004 | Schultz ................... F23D 14/70 126/110 R |
| 2006/0185373 | A1 | 8/2006 | Butler et al. |
| 2007/0012052 | A1 | 1/2007 | Butler et al. |
| 2008/0237217 | A1 | 10/2008 | Helt |
| 2014/0202443 | A1 | 7/2014 | Sherrow et al. |
| 2015/0354834 | A1 | 12/2015 | Barone |
| 2018/0259199 | A1 | 9/2018 | Batson et al. |
| 2019/0195219 | A1 | 6/2019 | Okuno et al. |
| 2020/0132331 | A1* | 4/2020 | Wilson ................ G05B 19/042 |
| 2021/0054998 | A1* | 2/2021 | Post ........................ F23N 1/082 |

* cited by examiner

SYSTEMS AND METHODS FOR OPERATING A FURNACE

CROSS-REFERENCE TO RELATED APPLICATIONS

This application is a continuation of U.S. patent application Ser. No. 16/926,403, filed Jul. 10, 2020, entitled SYSTEMS AND METHODS FOR OPERATING A FURNACE, the content of which is incorporated herein by reference in its entirety.

STATEMENT REGARDING FEDERALLY SPONSORED RESEARCH OR DEVELOPMENT

Not applicable.

BACKGROUND

Climate control systems, such as heating, ventilation, and/or air conditioning (HVAC) systems may generally be used in residential and/or commercial areas for heating and/or cooling to create comfortable temperatures inside those areas. Climate control systems may include a gas-fired furnace generally configured to combust fuel and air and thereby generate heat, which may be delivered to a comfort zone. The furnace may include a burner assembly generally configured to combust fuel and air whereby resultant combustion gases are forced into and through a heat exchanger of the furnace. The furnace may also include a circulation fan or blower to produce an airflow across an external surface of the heat exchanger to transfer thermal energy from the heat exchanger to the airflow, which may be delivered to the comfort zone.

BRIEF SUMMARY

Some embodiments disclosed herein are directed to a method for operating a furnace. In an embodiment, the method includes activating a burner assembly and a first fan of the furnace to combust fuel and air and circulate combustion gases along a flow path extending through a heat exchanger of the furnace. In addition, the method includes operating a second fan of the furnace to circulate air across an external surface of the heat exchanger of the furnace and produce a conditioned airflow. Further, the method includes monitoring one or more parameters of a motor of the second fan indicative of an airflow rate of the conditioned airflow, and deactivating the burner assembly, whereby combustion of the fuel and air in the furnace ceases, in response to the one or more parameters indicating that the airflow rate is less than a minimum airflow rate.

Other embodiments disclosed herein are directed towards a furnace. In an embodiment, the furnace includes a burner assembly configured to combust fuel and air to produce combustion gases, a first fan configured to circulate the combustion gases along a flow path extending through a heat exchanger of the furnace, and a second fan configured to circulate air across an external surface of the heat exchanger to produce a conditioned airflow. In addition, the furnace includes a controller configured to activate the burner assembly and the first fan to combust the fuel and air and circulate the combustion gases along the flow path, and operate the second fan to circulate the air across the external surface of the heat exchanger and produce the conditioned airflow. In addition, the controller is configured to monitor one or more parameters of a motor of the second fan indicative of an airflow rate of the conditioned airflow, and deactivate the burner assembly whereby combustion of the fuel and air ceases in response to the one or more parameters indicating that the airflow rate is less than a minimum airflow rate.

Further embodiments disclosed herein are directed to a non-transitory machine-readable medium. In an embodiment, the non-transitory machine-readable medium includes instructions that, when executed by a processor, cause the processor to activate a burner assembly and a first fan of a furnace to combust fuel and air and circulate combustion gases along a flow path extending through a heat exchanger of the furnace, and operate a second fan of the furnace to circulate air across an external surface of the heat exchanger of the furnace and produce a conditioned airflow. In addition, the instructions, when executed by a processor, cause the processor to monitor one or more parameters of a motor of the second fan indicative of an airflow rate of the conditioned airflow, and deactivate the burner assembly, whereby combustion of the fuel and air ceases, in response to the one or more parameters indicating that the airflow rate is less than a minimum airflow rate.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
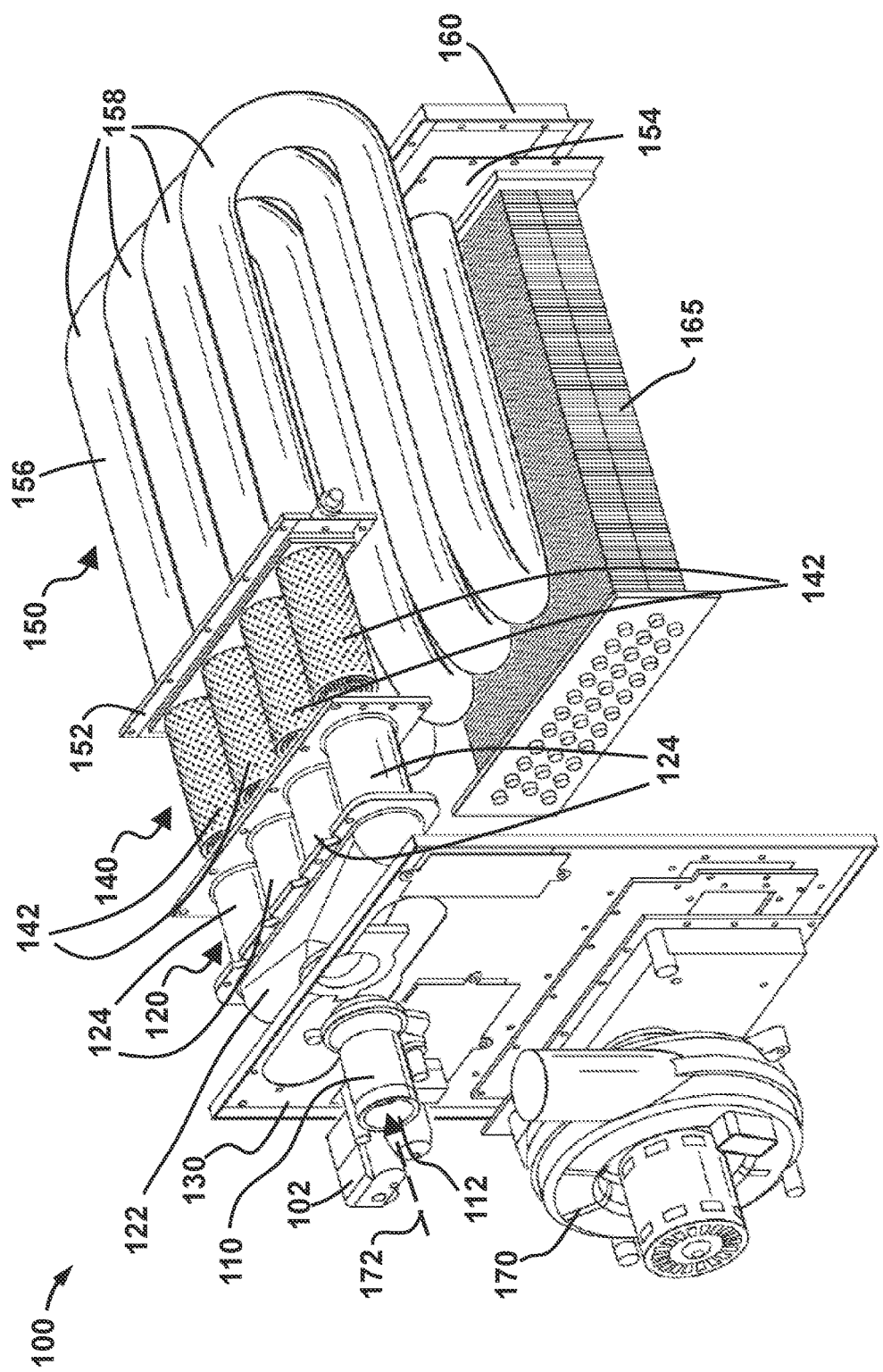
FIG. 1 is a perspective exploded view of a furnace according to some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or a direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%.

As described above, a gas-fired furnace is generally configured to combust fuel and air and thereby generate heat that may be delivered to a comfort zone of an indoor area via a circulation fan or blower of the furnace. Particularly, the furnace may be configured to provide a temperature rise between a temperature of an inlet airflow of the furnace and a temperature of a conditioned airflow of the furnace. The temperature rise is targeted to a predefined temperature rise range in which the furnace is designed to operate. Thus, the temperature rise range of the furnace may depend upon the configuration of the furnace. For instance, a first exemplary furnace having a first configuration may have a temperature rise range between 30 degrees fahrenheit (° F.) and 60° F., while a second exemplary furnace, having a second configuration that is different from the first configuration, may have a temperature rise range between 40° F. and 70° F.

The temperature rise produced by the furnace may vary during operation in response to changes in the amount of airflow through the furnace produced by the circulation fan. Generally, at a given rate of combustion within the furnace, the temperature rise provided by the furnace between a temperature of the inlet airflow and a temperature of the conditioned airflow may increase in response to a decrease in the amount of airflow circulated through the furnace. In other words, a decrease in the airflow rate provided by the circulation fan results in less volume of air available to absorb the heat generated within the furnace over a given period of time. Conversely, the temperature rise provided by the furnace may decrease in response to an increase in the amount of airflow circulated through the furnace (i.e., an increase in the airflow rate provided by the circulation fan) as more airflow is available to absorb the heat generated within the furnace over a given period of time.

In some applications, if the temperature rise provided by the furnace decreases below a lower end of the temperature rise range of the furnace, the temperature of the conditioned airflow may not be warm enough to adequately heat the comfort zone. Additionally, if the temperature rise provided by the furnace increases above the temperature rise range of the furnace, the temperature of the conditioned airflow may exceed a maximum permissible conditioned airflow temperature of the furnace. The maximum permissible conditioned airflow temperature of the furnace may vary depending upon the application and the configuration of the furnace, but in some applications may correspond to a temperature equal to an upper end of the temperature rise range of the furnace plus a fixed margin which may, in some applications, range approximately between 100 degrees fahrenheit (° F.) and 200° F. As an example, the maximum permissible conditioned airflow temperature for a furnace having a temperature rise range of 30° F. and 60° F. would be 160° F. when the fixed margin is equal to 100° F. Additionally, a conditioned airflow temperature exceeding the maximum permissible conditioned airflow temperature of the furnace may eventually result in damage to the furnace due to overheating of the furnace and/or heat-related discomfort to occupants of the comfort zone of the indoor area. A conditioned airflow temperature produced by the furnace that is in excess of a target conditioned airflow temperature (e.g., as requested by a controller of the furnace) may result from improper installation of the furnace, a malfunction of the circulation fan or other component of the furnace, and/or a clogged filter or air cleaner of the furnace.

In conventional furnaces, the furnace includes a temperature limit switch, such as a spring-operated bimetallic switch. The switch opens automatically to shut off the burner in response to a temperature of the bimetallic switch reaching a predefined set-point temperature. Using a bimetallic switch to trigger shutoff has drawbacks. For example, the performance of the bimetallic switch may be orientation specific, requiring the switch to be installed within the furnace in a particular orientation for the switch to function as intended, limiting the flexibility in which the components of the furnace may be internally positioned, as well as the ways in which the furnace may be oriented in the indoor space. Additionally, a bimetallic switch is a separate component that adds cost to the furnace.

Accordingly, embodiments disclosed herein include systems and methods for operating a furnace whereby a temperature limit switch, such as a spring-operated bimetallic switch, is rendered superfluous in preventing the furnace from exceeding its designed temperature rise range. Particularly, embodiments disclosed herein include systems and methods for operating a furnace that includes operating a gas-fired furnace to produce a conditioned airflow, monitoring one or more parameters indicative of an airflow rate of the conditioned airflow, and deactivating a burner assembly of the furnace in response to the one or more parameters indicating that the airflow rate is less than a minimum airflow rate. Embodiments disclosed herein also include systems and methods for operating a furnace that includes operating a gas-fired furnace to produce a conditioned airflow, monitoring a parameter that is indirectly indicative of a temperature of the conditioned airflow, and deactivating a burner assembly of the furnace in response to the parameter indirectly indicating that the temperature of the conditioned airflow exceeds a threshold. As will be described in more detail below, use of the embodiments disclosed herein may allow for the operation of a furnace in a manner that prevents the furnace from exceeding a maximum permissible conditioned airflow temperature thereof without needing to rely on a temperature limit switch, such as a spring-operated bimetallic switch.

Figure 2:
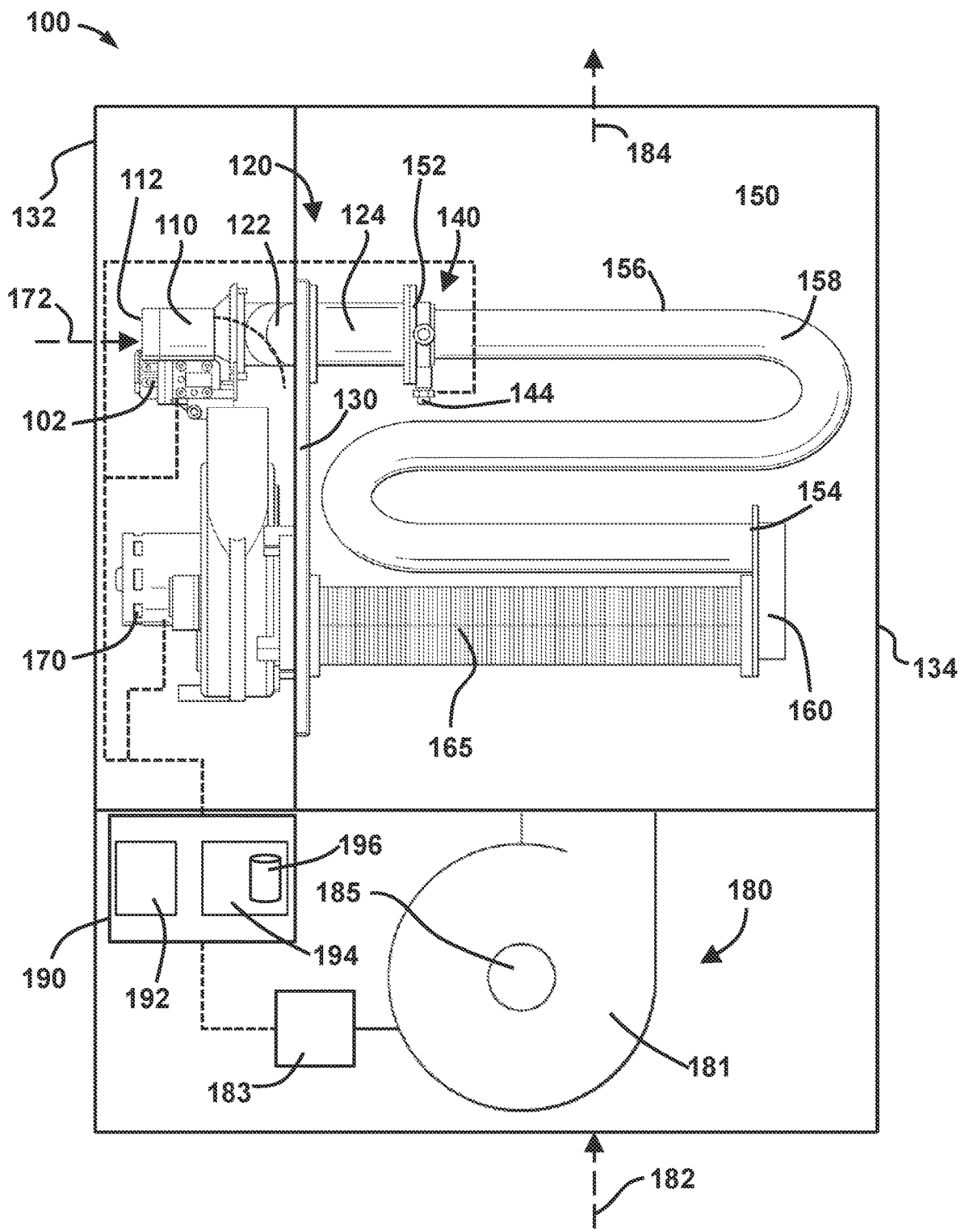
FIG. 2 is an orthogonal view of the furnace of FIG. 1.

Referring now to FIGS. 1, 2, an embodiment of a gas-fired furnace 100 is shown. As discussed herein, a furnace (e.g., furnace 100) may be referred to as being "gas-fired", where the "gas-fired" furnace is configured to be in fluid communication with a gas flow for thermodynamic heat transfer and where the gas-flow comprises products of a combustion reaction from a burner. In some embodiments, furnace 100 may comprise a component of an HVAC system that includes an indoor unit comprising furnace 100 and an indoor refrigerant heat exchanger or evaporator, an outdoor unit comprising an outdoor fan and an outdoor refrigerant heat exchanger or condenser, and a refrigerant loop extending between the indoor and outdoor refrigerant heat exchangers. Furnace 100 may configured as an indoor furnace that provides conditioned air to a comfort zone of an indoor space. However, in general, the components of furnace 100 may be equally employed in an outdoor or weatherized furnace to condition an interior space. Moreover, furnace 100 may be used in residential or commercial applications.

In some embodiments, furnace 100 may generally include a fuel supply valve 102, an air and fuel (air/fuel) mixing unit 110, an intake manifold 120, a partition panel 130, a burner assembly 140, a plurality of heat exchangers 150, a hot collector box 160, and a first fan or draft inducer 170. Mixing unit 110 may be coupled end-to-end with intake manifold 120. Additionally, burner assembly 140 may be positioned between intake manifold 120 and heat exchangers 150, where heat exchangers 150 may extend from burner assembly 140 to hot collector box 160.

The air/fuel mixing unit 110 of furnace 100 may be configured for the introduction of fuel and air to allow at least partial mixing of fuel and air before a combustion reaction process. Air/fuel mixing unit 110 may receive air via an air inlet 112 and fuel via fuel supply valve 102 to allow at least partial mixing of the fuel and air. For example, the fuel may be natural gas available from the fuel supply valve 102 attached and operatively engaged with the air/fuel mixing unit 110. Fuel supply valve 102 may be configured to be adjusted, such as electrically or pneumatically, so as to obtain a desired and/or predefined air-to-fuel ratio. As will be discussed further herein, fuel supply valve 102 may be configured for staged operation and/or modulation type operation, and may be operatively connected to a controller 190 (shown schematically in FIG. 2) of furnace 100. For example, staged operation may comprise two flame settings, whereas modulation type operation may be incrementally adjustable over a large range of outputs, such as, for example, from 40% to 100% output capacity. While furnace 100 is shown in FIGS. 1, 2 as comprising a premix furnace configured to mix air and fuel within air/fuel mixing unit 110, in other embodiments, furnace 100 may not include air/fuel mixing unit 110 and may instead be configured to mix the fuel and air within burner assembly 140.

The intake manifold 120 of heat exchanger 100 may generally include a flow distributor 122 extending from an inlet of intake manifold 120 coupled with air/fuel mixing unit 110. Intake manifold 120 may also include a plurality of heat exchanger supply tubes 124 extending from flow distributor 122 to an outlet of intake manifold 120 coupled with heat exchanger 150.

The burner assembly 140 of furnace 100 may include a plurality of burners 142 and at least one igniter 144 (shown in FIG. 2). Each burner 142 of burner assembly 140 may be received in one of the supply tubes 122 of intake manifold 120. Igniter 144 of burner assembly 140 may be positioned at an opening of each burner 142 and may be configured to induce a combustion reaction by igniting a gas flow passing in and/or by burners 142, where the gas flow comprises a mixture of the air and fuel. Particularly, the gas flow may initially take the form of air and fuel that is at least partially mixed and/or uncombusted (i.e., not yet ignited or undergone a combustion reaction) in air/fuel mixing unit 110. As the gas flow travels through intake manifold 120 and heat exchanger 150, burners 142 and igniter 144 of burner assembly 140 may initiate a combustion reaction. Combustion may occur at least partially within an interior space of each burner 142 so that heat is generated and forced out of the open end of the burner 142 and into the heat exchanger tube 150. In some embodiments, igniter 144 may comprise any of a pilot light, a piezoelectric device, and/or a hot surface igniter. Igniter 144 may be controlled by controller 190 of furnace 100.

In some embodiments, the heat exchanger 150 of furnace 100 has a first end 152 coupled to intake manifold 120 and a second end 154 coupled to hot collector box 160. Heat exchanger 150 may comprise an exterior surface 156 and a plurality of heat exchanger tubes 158 extending between the first end 152 and the second end 154. In some embodiments, each heat exchanger tube 158 is a bent, S-shaped tube that extends through a tortuous path to enhance the surface area available for heat transfer with the surrounding circulation air. However, in other embodiments, the configuration of heat exchanger 150 may vary. In some embodiments, a finned condensing heat exchanger 165 may extend from hot collector box 160 to draft inducer 170. However, generally, furnace 100 may be operated with or without a condensing heat exchanger as a "condensing" or "non-condensing" furnace, respectively.

In some embodiments, the gas flow may follow a combustion flow path (indicated by arrow 172) that may be in a direction beginning at the air/fuel mixing unit 110 and ending at the draft inducer unit 170. For example, combustion flow path 172 may follow from the air/fuel mixing unit 110, through intake manifold 120, past burners 162 and through heat exchanger tubes 158 of heat exchanger 150. Combustion flow path 172 may continue through hot collector box 160 and condensing heat exchanger 165, and may exit past draft inducer 170 towards a designated venting environment (not shown in FIGS. 1, 2). It is understood that there may be more or less components of furnace 100 in fluid communication with combustion flow path 172.

In some embodiments, the gas flow described above may be introduced into furnace 100 by operating in an induced draft mode by pulling the gas flow through furnace 100 via draft inducer 170, or by operating in a forced draft mode by pushing the gas flow through furnace 100. Draft inducer 170 may comprise a blower or fan which is in fluid communication with combustion flow path 172 and is down-stream of heat exchanger 150. Draft inducer 170 may pull and/or extract the gas flow out from heat exchanger 150 by creating a relatively lower pressure at one end of combustion flow path 172. Embodiments using a forced draft mode may be accomplished by placing a blower or fan at the inlet of air/fuel mixing unit 110 and forcing the gas flow into and through air/fuel mixing unit 110 and along combustion flow path 172.

As shown particularly in FIG. 2, in addition to partition panel 130, furnace 100 may also include a first side panel 132, and a second side panel 134. Panels 130, 132, and 134 may be disposed in a configuration such that fluids (e.g. air) that contact an exterior surface of a component of furnace 100 (e.g. fluid passing over the exterior surface 156 of heat exchanger 150 for thermodynamic heat transfer) are segregated from the gas flow circulating along combustion flow path 172.

Furnace 100 may further include a second or circulation fan 180. Circulation fan 180 may be configured to receive an inlet airflow 182 and force or drive the inlet airflow 182 into contact with the exterior surface 156 of heat exchanger 150. In other embodiments, circulation fan 180 may draw the airflow 182 across the exterior surface 156 of heat exchanger 150. In response to the inlet airflow 182 contacting heat exchanger 150, heat may be transferred from the gas flow circulating within heat exchanger 150 to the inlet airflow 182, thereby heating inlet airflow 182. Following contact with heat exchanger 150, the airflow may exit furnace 100 as an outlet or conditioned airflow 184, which may have a temperature that is greater than a temperature of the inlet airflow 182. Conditioned airflow 184 may be delivered to a comfort zone of an indoor space.

In some embodiments, circulation fan 180 may comprise a centrifugal blower comprising a blower housing 181, and a blower motor 183 configured to selectively rotate a blower impeller 185 of the circulation fan 180 that is at least partially disposed within blower housing 181. In other embodiments, circulation fan 180 may comprise a mixed-flow fan and/or any other suitable type of fan. Circulation fan 180 may be configured as a modulating and/or variable speed fan capable of being operated at many speeds over one or more ranges of speeds. In other embodiments, circulation fan 180 may be configured as a multiple speed fan capable of being operated at a plurality of operating speeds by selectively electrically powering different ones of multiple electromagnetic windings of the motor 183 of circulation fan 180.

As shown particularly in FIG. 2, furnace 100 may comprise controller 190 for controlling one or more components of furnace 100. Generally speaking, controller 190 is coupled to various components of furnace 100 as well as various sensors configured to detect various operating parameters within furnace 100. For example, in some embodiments, controller 190 of furnace 100 may communicate with and/or otherwise affect control over fuel supply valve 102, igniter 144 of burner assembly 140, draft inducer 170, and/or circulation fan 180. Additionally, controller 190 may control draft inducer 170 to provide an adequate gas flow along combustion flow path 172 for a desired firing rate through burner assembly 140.

Controller 190 may comprise a singular controller or control board or may comprise a plurality of controllers or control boards that are coupled to one another. For example, controller 190 may comprise a distinct control board positioned on a panel (e.g., panels 130, 132, and/or 134) of furnace 100 and/or a control board positioned within the motor 183 of circulation fan 180. For convenience, and to simplify the drawings, controller 190 is depicted schematically in FIG. 2 as a single controller unit that is coupled to various components within furnace 100. Particularly, controller 190 may comprise a processor 192 and a memory 194. Processor 192 (e.g., microprocessor, central processing unit (CPU), or collection of such processor devices, etc.) executes machine-readable instructions 196 provided on memory 194 (e.g., non-transitory machine-readable medium) to provide controller 190 with all the functionality described herein. Memory 194 may comprise volatile storage (e.g., random access memory (RAM)), non-volatile storage (e.g., flash storage, read-only memory (ROM), etc.), or combinations of both volatile and non-volatile storage. Data consumed or produced by the machine-readable instructions 196 can also be stored on memory 194. As noted above, in some embodiments, controller 190 may comprise a collection of controllers and/or control boards that are coupled to one another. As a result, in some embodiments, controller 190 may comprise a plurality of processors 192, memories 194, etc.

As described above, an HVAC system including an indoor unit and an outdoor unit may include furnace 100 as a component of the indoor unit thereof. The HVAC system may include a system controller, which may be disposed in a thermostat of the HVAC system and may be generally configured to affect control over the indoor and outdoor units of the HVAC system. For example, the system controller may request a target firing rate of the burner assembly 140 of furnace 100 in response to an ambient temperature of a comfort zone conditioned by the HVAC system falling below a user-defined set point temperature. In some embodiments, controller 190 may comprise a controller of furnace 100 that is separate and distinct from, but in selective communication with, one or more controllers or control boards of the HVAC system (e.g., the system controller of the HVAC system, etc.). However, in other embodiments, controller 190 may comprise a plurality of controllers or control boards of the HVAC system that are coupled to one another. For example, in some embodiments, controller 190 may comprise both a controller or control board of furnace 100 and the system controller of the HVAC system disposed in the thermostat thereof. Thus, in some embodiments, one or more controllers or control boards of controller 190 may affect control over components of the HVAC system other than furnace 100 (e.g., the outdoor unit of the HVAC system, etc.).

In some embodiments, controller 190 may be configured to receive information related to a speed and a torque of circulation fan 180 whereby controller 190 may continuously determine the speed and the torque of the motor 183 of circulation fan 180. Additionally, controller 190 may be configured to estimate an airflow produced by circulation fan 180 by monitoring one or more parameters of the motor 183 of circulation fan 180, such as a speed and a torque of motor 183. The one or more parameters of motor 183 may be measured parameters of motor 183 and/or parameters determined from measured parameters of motor 183. For example, motor 183 may comprise one or more sensors configured to measure one or more parameters of motor 183, such as current, a counter or back electromotive force (EMF) of motor 183, a voltage supplied to motor 183, etc. The measured parameters of motor 183 measured by the one or more sensors thereof may be communicated to controller 190. Controller 190 may be configured to determine one or more parameters of motor 183, such as the speed and torque of motor 183, based on the parameters of motor 183 measured by the one or more sensors of motor 183 and communicated to controller 190. Additionally, in some embodiments, controller 190 may be configured to determine one or more parameters of the motor 183 of circulation 180, such as a speed and a torque of motor 183, required to achieve a desired or targeted airflow rate of circulation fan 180. For example, the controller 190 may monitor and adjust one or more measured parameters of motor 183 (e.g., a current and/or voltage supplied to motor 183) to ensure a speed and torque of motor 183 required to achieve the targeted airflow rate is maintained.

Prior to installation of furnace 100, the furnace 100 (or another test furnace, including a test circulation blower, similar in configuration to furnace 100) may be tested at an air plenum test facility at a range of known airflows (i.e., independently measured by equipment of the test facility) to thereby create a motor map or discrete value look-up table correlating airflow produced by circulation fan 180 with the motor speed and torque of motor 183 of circulation fan 180. As a non-limiting example, a motor map may include airflow along an X-axis thereof, motor power (which may be calculated from a determined motor torque) along a Y-axis thereof, and a plurality of curves each corresponding to a fixed speed of the motor of circulation fan 180. In this manner, an estimated airflow may be "looked-up" from the motor map from a known motor speed and torque. However, additional functional relationships for airflow may be used to correlate determined motor speed and torque with estimated airflow.

Further, controller 190 may also be configured to determine a minimum airflow rate corresponding to an estimated rate of conditioned airflow 184 of furnace 100 which corresponds to a maximum permissible conditioned airflow temperature (e.g., maximum permissible conditioned airflow temperature of conditioned airflow 184) of furnace 100. Particularly, prior to installation of furnace 100, the furnace 100 (or another test furnace similar in configuration to furnace 100) may be tested at a test facility by activating the burner assembly 140 of furnace 100 and operating circulation fan 180 at a range of airflows (either independently measured by equipment of the test facility or estimated from the motor map). As the circulation fan 180 is operated at a range of airflows, the temperature of conditioned airflow 184 of furnace 100 may be independently measured by equipment of the test facility to thereby estimate the airflow rate of conditioned airflow 184 which corresponds to the maximum permissible conditioned airflow temperature of furnace 100.

In some embodiments, the inlet airflow provided to the furnace (e.g., furnace 100) during testing may be at a fixed nominal inlet airflow temperature. The nominal inlet airflow temperature using during testing may be a temperature that is near, at, or above a maximum inlet airflow temperature the furnace is expected to receive during operation following installation to ensure that the temperature of the inlet airflow received by the furnace during operation does not substantially exceed the nominal airflow temperature used during testing.

In certain embodiments, during operation of the furnace, a controller (e.g., controller 190) may monitor a temperature of the inlet airflow (e.g., inlet airflow 182) and may compare the inlet airflow temperature with the nominal inlet airflow temperature used during testing and adjust the maximum permissible conditioned airflow temperature in response to the monitored inlet airflow temperature exceeding the nominal inlet airflow temperature. For example, the controller may decrease the maximum permissible conditioned airflow temperature in proportion to the difference between the monitored inlet airflow temperature and the nominal inlet airflow temperature (e.g., reduce the maximum permissible conditioned airflow temperature 5° F. in response to the monitored inlet airflow temperature exceeding the nominal inlet airflow temperature by 5° F., etc.). The temperature of the inlet airflow received by the furnace may be determined using a dedicated temperature sensor positioned in a flow-path of the inlet airflow. Alternatively, the controller may monitor an indoor temperature determined by, for example, a thermostat of an HVAC system comprising the furnace in order to estimate the temperature of the indoor airflow received by the thermostat.

Figure 3:
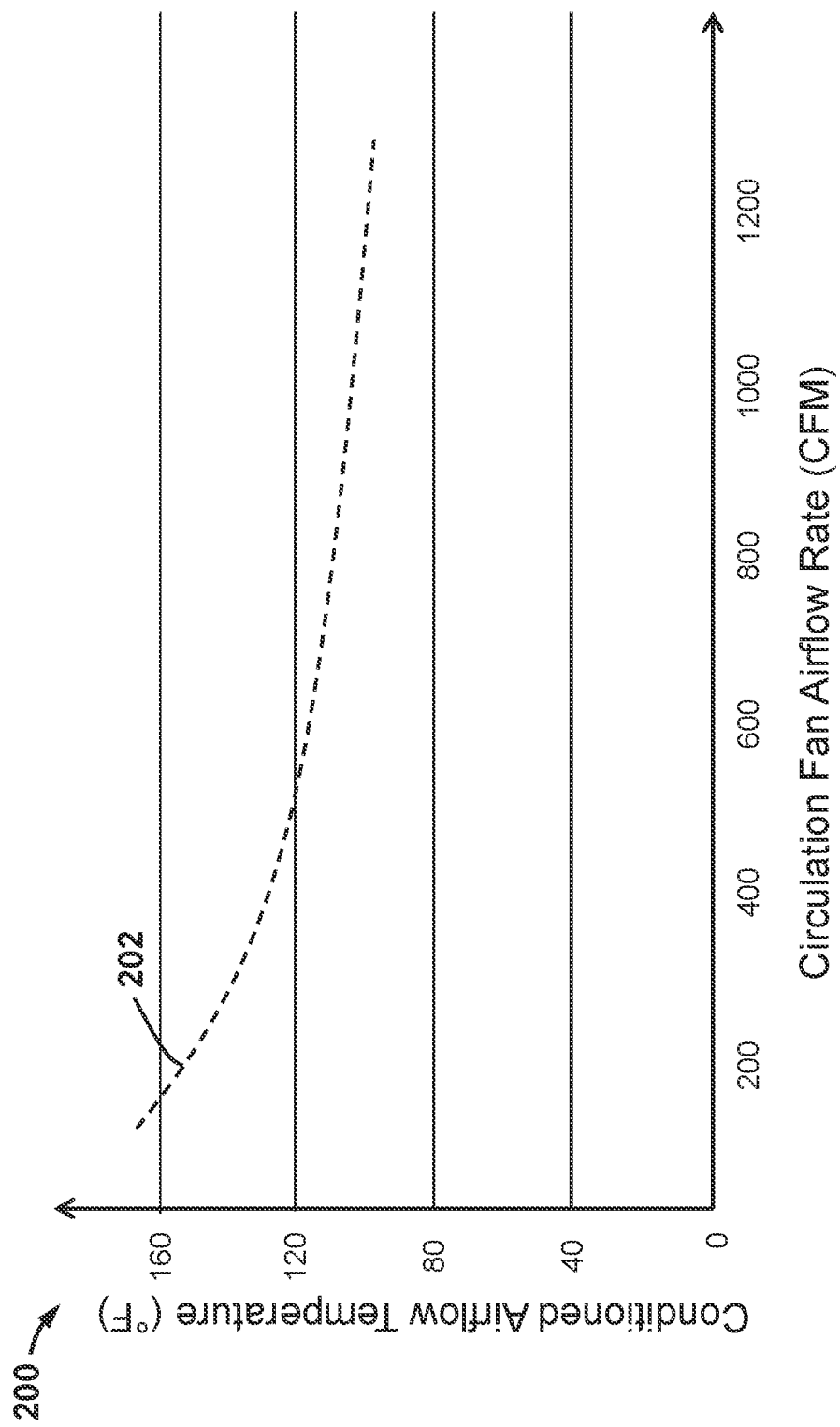
FIG. 3 is a conditioned airflow temperature map of a gas-fired furnace according to some embodiments.

In some embodiments, a conditioned airflow temperature map of furnace 100 which correlates or maps the conditioned airflow temperature of furnace 100 (reflecting the temperature of the inlet airflow 182 as well as the temperature rise of the airflow through the furnace 100) to the airflow produced by circulation fan 180 may also be produced during testing. For example, referring briefly to FIG. 3, an exemplary conditioned airflow temperature map 200 of a gas-fired furnace (e.g., furnace 100) is shown. Conditioned airflow temperature map includes an airflow rate in cubic feet per minute (CFM) of the circulation fan 180 of furnace 100 along an X-axis thereof (which may be estimated from a determined speed and torque of the motor 183 of circulation fan 180 utilizing a motor map), and conditioned airflow temperature (e.g., temperature of conditioned airflow 184 of furnace 100) along a Y-axis thereof in degrees fahrenheit (° F.). Additionally, conditioned airflow temperature map 200 includes a curve 202 corresponding to the estimated conditioned airflow temperature as a function of the airflow rate produced by circulation fan 180. In this manner, an estimated conditioned airflow temperature may be "looked-up" from conditioned airflow temperature map 200 from a determined speed and torque of the motor 183 of circulation fan 180. As shown in FIG. 3, the airflow rate of circulation 180 is negatively correlated with the temperature of conditioned airflow 184.

Referring again to FIGS. 1, 2, the minimum airflow rate of furnace 100 determined during testing may be stored in the memory of controller 190 prior to the installation of furnace 100. In some embodiments, the motor map and the conditioned airflow temperature map created during testing may also be stored in the memory of controller 190 prior to the installation of furnace 100.

In this manner described above, controller 190 of furnace 100 may apply determined motor speed and torque values to the motor map and conditioned airflow temperature map stored in the memory of controller 190 to thereby determine or look-up an estimated conditioned airflow temperature of furnace 100 based on the determined motor speed and torque of circulation fan 180. In some embodiments, the motor map and minimum airflow rate may be stored in the memory of controller 190, and controller 190 may apply determined motor speed and torque values to the motor map stored in the memory thereof to determine whether the airflow rate produced by circulation fan 180 falls below the minimum airflow rate of furnace 100.

In some embodiments, furnace 100 may not include a temperature limit switch (e.g., a spring-operated bimetallic switch) for preventing furnace 100 from exceeding a designed temperature rise range of furnace 100. Instead, as further described below, controller 190 may be configured to prevent furnace 100 from exceeding the temperature rise range of furnace 100 without needing to rely on a separate temperature limit device or switch (e.g., a spring-operated bimetallic switch).

Furnace 100 may be operated to provide heat to one or more areas and/or comfort zones of an indoor space by transferring heat from hot combustion gases flowing along combustion flow path 172 generated by furnace 100 to a conditioned airflow 184 that may be delivered to the comfort zone of the indoor space. For example, controller 190 of furnace 100 may "turn on" or activate the burner assembly 140 of furnace 100 by opening fuel supply valve 102 and operating igniter 144 and draft inducer 170 of furnace 100 to thereby combust fuel and air in burner assembly 140 and/or heat exchanger 150 and induce a flow of combustion gases along combustion flow path 172. Additionally, as combustion gases are circulated along combustion flow path 172, controller 190 may operate circulation fan 180 to receive an inlet airflow 182 and circulate (e.g., blow or pull) air over the external surface 156 of heat exchanger 150. Circulation fan 180 may also be operated by controller 190 to circulate the conditioned airflow 184 from furnace 100 to the comfort zone of the indoor space. In some embodiments, controller 190 may also cease activation or deactivate furnace 100 by "shutting off" or deactivating the burner assembly 140 by closing the fuel supply valve 102 and cease the operation of igniter 144 and draft inducer 170 to thereby cease the flow of combustion gases along combustion flow path 172. Controller 190 may also cease the operation of circulation fan 180 following the deactivation of burner assembly 140.

Figure 4:
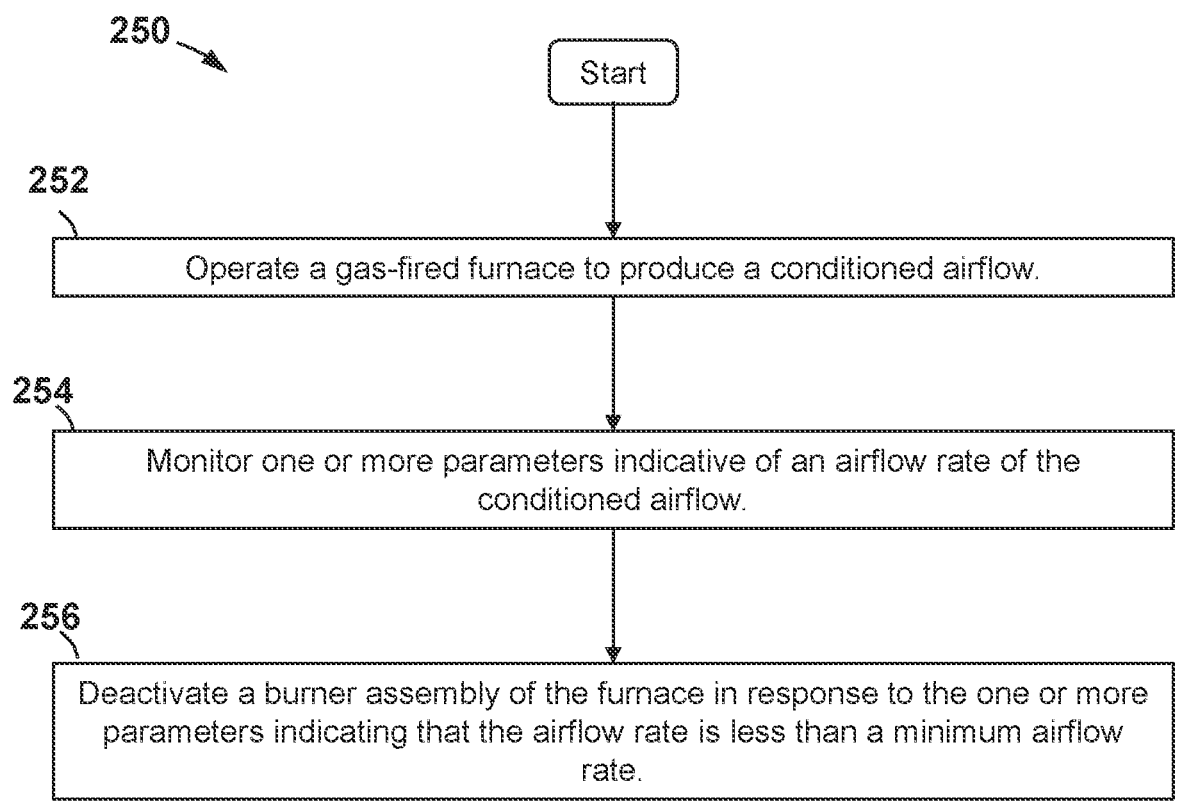
FIG. 4 is a flow chart of a method for operating a furnace according to some embodiments.

Referring now to FIG. 4, a method 250 for operating a furnace is shown. In some embodiments, method 250 may be practiced with furnace 100. Thus, in describing the features of method 250, continuing reference will made to the furnace 100 shown in FIGS. 1, 2; however, it should be appreciated that embodiments of method 250 may be practiced with other systems, assemblies, and devices. Generally speaking, method 250 includes monitoring one or more parameters indicative of an airflow rate of a conditioned airflow of a gas-fired furnace, and deactivating the furnace in response to the one or more parameters indicating that the airflow rate of the conditioned airflow is less than a minimum airflow rate.

Initially, method 250 includes operating a gas-fired furnace (e.g., furnace 100) to produce a conditioned airflow at method block 252. The operation of the furnace at block 252 may be performed at a test facility prior to the installation of the furnace, or at an indoor space (e.g., a home, etc.) following the installation of the furnace. In some embodiments, method block 252 may include activating a burner assembly and a first fan of the furnace (e.g., burner assembly 140 and draft inducer 170 of furnace 100) to combust fuel and air and circulate combustion gases along a flow path (e.g., combustion flow path 172) extending through a heat exchanger of the furnace (e.g., heat exchanger 150). For example, controller 190 may open fuel supply valve 102 and activate burner assembly 140 and inducer fan 170 of furnace 100 to thereby combust fuel and air, which may be circulated through heat exchanger 150 along combustion flow path 172. Method block 252 may also include operating a second fan of the furnace (e.g., circulation fan 180) to circulate air across the heat exchanger to produce a conditioned airflow. For example, controller 190 may operate circulation fan 180 to circulate air over the external surface 156 of heat exchanger 150 and provide a conditioned airflow 184 that may be delivered to a comfort zone of the indoor space.

Method 250 proceeds at method block 254 by monitoring one or more parameters indicative of an airflow rate of the conditioned airflow. In some embodiments, the one or more parameters may comprise one or more parameters of a motor of the second fan (e.g., motor 183 of circulation fan 180). The one or more parameters of the motor may be determined from one or more other parameters of the motor that are measured. For example, method block 254 may include determining a speed and a torque of a motor of a circulation fan (e.g., motor 183 of circulation fan 180) of the furnace. In some embodiments, block 254 comprises determining a speed and a torque of the motor 183 of the circulation fan 180 of furnace 100 as the circulation fan 180 provides the conditioned airflow 184 exiting furnace 100. As described above, motor 183 of circulation fan 180 may communicate one or more measured parameters of motor 183 to controller 190, and controller 190 may be configured to determine the speed and torque of motor 183 based on the measured parameters of motor 183. The one or more measured parameters of motor 183 used to determine the speed and torque of motor 183 may comprise a current and/or voltage supplied to motor 183, a counter or back EMF of motor 183, etc. Method block 254 may include controller 190 continuously determining speed and torque values of the motor 183 of circulation fan 180 during the operation of furnace 100. In some embodiments, block 254 may include controller 190 determining other parameters of motor 183, such as a shaft or output power of motor 183.

Method block 254 may optionally include estimating an airflow rate of the conditioned airflow produced by the circulation fan (e.g., circulation fan 180 of furnace 100) based on the determined speed and torque of the motor of the circulation fan (e.g., motor 183 of circulation fan 180). For example, method block 254 may optionally include estimating the airflow rate as circulation fan 180 of furnace 100 produces the conditioned airflow 184. In this optional step, the airflow rate of the conditioned airflow produced by circulation fan 180 may be estimated by controller 190 of furnace 100 as furnace 100 is operated to produce the conditioned airflow 184. For example, controller 190 may periodically estimate the airflow rate of circulation fan 180 based on the determined speed and torque of motor 183 of circulation fan 180 and a motor map stored in the memory of controller 190.

Method 250 continues at method block 256 by deactivating the burner assembly of the furnace (e.g., burner assembly 140) in response to the one or more parameters indicating that the airflow rate is less than a minimum airflow rate. The minimum airflow rate may be predefined and may comprise an airflow rate produced by the circulation fan that corresponds to a temperature of the conditioned airflow (e.g., the temperature of conditioned airflow 184) equaling a maximum permissible conditioned airflow temperature of the furnace. For example, as described above, the minimum airflow rate may be determined from testing of the furnace at a test facility prior to installation where the airflow rate produced by the circulation fan is negatively correlated with the temperature of the conditioned airflow of the furnace. In some embodiments, the minimum airflow rate may be saved in the memory of a controller (e.g., controller 190) prior to the installation of the furnace.

The maximum permissible conditioned airflow temperature of the furnace (e.g., furnace 100) may comprise a temperature in excess of an upper end of a predefined temperature rise range of the furnace. Particularly, the maximum permissible conditioned airflow temperature of the furnace may comprise a temperature above which damage due to overheating may result to the furnace and/or heat-related discomfort may occur to occupants of the indoor area heated by the furnace. In some embodiments, the maximum permissible conditioned airflow temperature of the furnace may comprise a temperature equal to an upper end of the designed temperature rise range of the furnace plus an additional fixed margin or safety factor. For instance, in an example where the fixed margin is equal to 100° F. and the designed temperature rise range of the furnace is between 30° F. and °60 F, the maximum permissible conditioned airflow temperature of the furnace may comprise 160° F. However, in other embodiments, the maximum permissible conditioned airflow temperature of the furnace may vary.

In some embodiments, method block 256 comprises deactivating or shutting-off a burner assembly of the furnace whereby combustion of air and fuel in the furnace ceases. For example, controller 190 of furnace 100, having the minimum airflow rate and a motor map of circulation fan 180 stored in a memory thereof, may determine (based on the determined speed and torque of the motor 183 of circulation fan 180) that the airflow rate of conditioned airflow 184 produced by circulation fan 180 is less than the minimum airflow rate. Controller 190 may close fuel supply valve 102 and cease the operation of igniter 144 and draft inducer 170 to cease the gas flow through furnace 100 along combustion flow path 172 in response to determining that the airflow rate of conditioned airflow 184 is less than the minimum airflow rate. Controller 190 may also deactivate or cease the operation of circulation fan 180 of furnace 100 following the deactivation of burner assembly 152 to cease the production of conditioned airflow 184.

In some embodiments, a controller (e.g., controller 190 of furnace 100) may issue an alert to a user of the furnace (e.g., a homeowner, an installer of the furnace, and/or a technician equipped to service the furnace) notifying the user that the burner assembly (e.g., burner assembly 140) of the furnace has been deactivated in response to the one or more parameters indicating that the airflow rate of the conditioned airflow produced by the circulation fan of the furnace (e.g., circulation fan 180) has fallen below the minimum airflow rate of the furnace so that the user may have the furnace serviced (e.g., replacing a filter of the furnace to reduce an obstruction to the circulation of airflow through the furnace, etc.). In some embodiments, the controller may place the furnace into an idle mode whereby operation of the furnace, including the burner assembly and/or the circulation fan thereof, is prevented for a predetermined period of time to allow for the burner assembly to cool before operation of furnace 100 may be resumed. Following the predetermined period of time, the controller may permit the activation of the furnace, including the combustion of air and fuel in the furnace, to satisfy a demand for heating of the indoor space.

In some embodiments, method 250 may optionally include operating a motor of the second fan at a speed or a torque that corresponds to a target rate of the conditioned airflow. For example, controller 190 of furnace 100 may operate the motor 183 of circulation fan 180 at a speed or a torque that corresponds to a target rate of conditioned airflow 184. The target rate of conditioned airflow may correspond to a target firing rate of the burner assembly of the furnace called by a system controller of an HVAC system comprising the furnace. For example, the system controller may request a target firing rate in response to an ambient temperature of a comfort zone conditioned by the HVAC system falling below a user-defined set point of the HVAC system.

Method 250 may also include increasing the speed or the torque of the motor of the second fan in response to the one or more parameters indicating that the airflow rate produced by the second fan is less than the target airflow rate. Additionally, the burner assembly of the furnace may be deactivated only in response to both the airflow rate being less than a predetermined minimum airflow rate, and either a speed or a torque of the motor of the second fan being at or above a predefined threshold. For example, controller 190 may continuously increase the speed or the torque of the motor 183 of circulation fan 180 in response to the one or more parameters indicating that the airflow rate of conditioned airflow 184 is less than the target rate until either the speed or the torque of the motor 183 of circulation fan 180 equals or exceeds a predefined threshold. The predefined threshold may comprise a designed maximum speed or torque of the motor 183 of circulation fan 180. In response to the speed or the torque of the motor 183 of circulation fan 180 being at or greater than the predefined threshold, and the airflow rate of circulation airflow 184 being less than the minimum airflow rate, controller 190 may deactivate burner assembly 140 to cease the combustion of fuel and air in furnace 100.

In some embodiments, method 250 may further optionally include estimating a temperature of the conditioned airflow of the furnace (e.g., the temperature of the conditioned airflow 184 of furnace 100) based on the estimated airflow rate of the conditioned airflow (e.g., conditioned airflow 184). For example, a controller (e.g., controller 190 of furnace 100) may periodically determine or estimate the temperature of the conditioned airflow of the furnace based on a conditioned airflow temperature map of the furnace stored in the memory of the controller. As described above, the conditioned airflow temperature map may be created during testing of the furnace at a testing facility prior to installation. In some embodiments, the conditioned airflow temperature map may be pre-stored in the memory of the controller prior to installation of the furnace. Additionally, in some embodiments, the minimum airflow rate may be determined from the conditioned airflow temperature map of the furnace, where the minimum airflow rate corresponds to the point along the curve of the conditioned airflow temperature map where the estimated conditioned airflow temperature equals the maximum permissible conditioned airflow temperature of the furnace.

Figure 5:
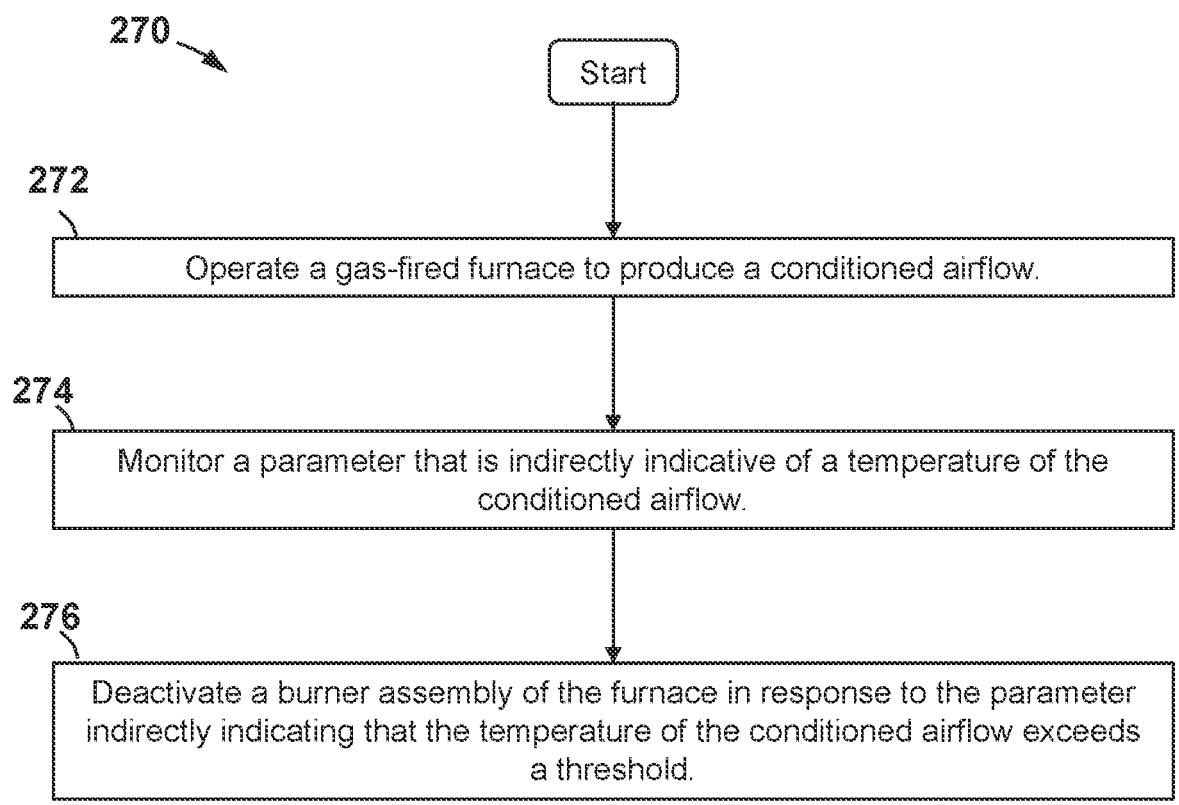
FIG. 5 is a flow chart of another method for operating a furnace according to some embodiments.

Referring now to FIG. 5, another method 270 for operating a furnace is shown in FIG. 5. In some embodiments, method 270 may be practiced with furnace 100 shown in FIGS. 1, 2. Thus, in describing the features of method 270, continuing reference will made to the furnace 100 shown in FIGS. 1, 2; however, it should be appreciated that embodiments of method 270 may be practiced with other systems, assemblies, and devices. Generally speaking, method 270 includes monitoring a parameter that is indirectly indicative of a temperature of a conditioned airflow produced by a gas-fired furnace, and deactivating the furnace in response to the parameter indirectly indicating that the temperature of the conditioned airflow exceeds a threshold.

Initially, method 270 includes operating a gas-fired furnace (e.g., furnace 100) to produce a conditioned airflow at method block 272. Method block 272 may be similar to the method block 252 of method 250 described above. For instance, method block 272 may include activating a burner assembly and a first fan of the furnace (e.g., burner assembly 140 and draft inducer 170) to combust fuel and air and circulate combustion gases along a flow path (e.g., combustion flow path 172) extending through a heat exchanger of the furnace (e.g., heat exchanger 150), and operating a second fan of the furnace (e.g., circulation fan 180) to circulate air across the heat exchanger to produce a conditioned airflow.

Method 270 proceeds at method block 274 by monitoring a parameter that is indirectly indicative of a temperature of the conditioned airflow. As used herein, "indirectivity indicative" refers to a relationship between two variables that is not directly proportional such that the two variables do not correspondingly increase or correspondingly decrease in the same ratio. In other words, the monitored parameter is not directly proportional to the temperature of the conditioned airflow. The parameter may be negatively correlated with the temperature of the conditioned airflow. In some embodiments, the parameter may comprise or be indicative of an airflow rate of the conditioned airflow or a speed and a torque of a motor of a second fan of the furnace (e.g., motor 183 of the circulation fan 180 of furnace 100). For example, controller 190 of furnace 100 may monitor speed and torque of the motor 183 of circulation fan 180 and estimate the airflow rate of circulation airflow 184 based on the monitored speed and torque of motor 183 as well as a motor map and a conditioned airflow temperature map stored in the memory of controller 190. As described above, the airflow rate of the conditioned airflow is negatively correlated with, and thus may be indirectly indicative of, the temperature of the conditioned airflow.

Method 270 continues at method block 276 by deactivating a burner assembly of the furnace (e.g., burner assembly 140 of furnace 100) in response to the parameter indirectly indicating that the temperature of the conditioned airflow exceeds a threshold. In some embodiments, the threshold may comprise a maximum permissible conditioned airflow temperature of the furnace. Thus, method block 276 may comprise deactivating the burner assembly of the furnace in response to the parameter indirectly indicating that the temperature of the conditioned airflow exceeds the maximum permissible conditioned airflow temperature of the furnace. For example, controller 190 of furnace 100 may deactivate burner assembly 140 to cease the combustion of fuel and air in furnace 100 in response to the parameter indirectly indicating that the temperature of conditioned airflow 184 exceeds the maximum permissible conditioned airflow temperature of the furnace. As described above with respect to method block 274, the parameter may comprise, or be indicative of, an airflow rate of the conditioned airflow or a speed and a torque of a motor of a second fan of the furnace (e.g., motor 183 of the circulation fan 180 of furnace 100).

Referring to FIGS. 4, 5, through use of the systems and methods described herein (e.g., furnace 100, methods 250, 270, etc.), a furnace may be deactivated in response to a conditioned airflow produced by a circulation fan of the furnace being less than a minimum airflow rate required to maintain a temperature of the conditioned airflow equal to or less than a maximum permissible conditioned airflow temperature of the furnace.

Specifically, a gas-fired furnace (e.g., furnace 100 shown in FIGS. 1, 2) may be operated to produce a conditioned airflow (e.g., producing a conditioned airflow at method blocks 252, 272 of methods 250, 270, respectively), monitoring one or more parameters indicative of an airflow rate of the conditioned airflow (e.g., monitoring one or more parameters indicative of the airflow rate at block 254 of method 250) and deactivating a burner assembly of the furnace in response to the one or more parameters indicating that the airflow rate of the conditioned airflow is less than the minimum airflow rate (e.g., deactivating a burner assembly of the furnace at block 256 of method 250). Additionally, a gas-fired furnace may be operated by monitoring a parameter that is indirectly indicative of a temperature of the conditioned airflow (e.g., monitoring the parameter at method block 274 of method 270), and deactivating the burner assembly of the furnace in response to the parameter indirectly indicating that the temperature of the conditioned airflow exceeds a threshold (e.g., deactivating the furnace at block 274 of method 270).

In this manner, the furnace may be deactivated once the temperature of the conditioned airflow produced by the furnace exceeds the maximum permissible conditioned airflow temperature of the furnace without needing to rely on a separate temperature limit switch (e.g., a spring-operated bimetallic switch). As described above, the temperature limit switch rendered superfluous by embodiments disclosed herein may add to the overall expense of the furnace while also requiring the furnace to be configured and/or installed in a particular orientation (limiting the flexibility in which the furnace may be internally configured and/or installed in an indoor space) in order to function as intended. Although the elimination of the temperature switch using the methods described above (e.g., methods 250, 270) is discussed in the context of gas-fired furnaces, methods described herein may be applied to prevent other heating units of HVAC systems, such as electrically powered supplemental or auxiliary heaters, from exceeding a maximum permissible conditioned airflow temperature.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A heating, ventilation, and air conditioning (HVAC) system comprising:
   a heat exchanger including an external surface;
   a circulation fan configured to circulate air across the external surface of the heat exchanger to produce a conditioned airflow; and
   a controller configured to:
      estimate an airflow rate of the conditioned airflow based on two or more parameters of a motor of the circulation fan, wherein at least one of the two or more parameters is indicative of a speed of the motor and at least another of the two or more parameters is indicative of a torque of the motor,
      operate the motor at a speed and a torque that corresponds to a target temperature differential of the conditioned airflow,
      increase one of either the speed or torque of the motor in response to the two or more parameters indicating that the airflow rate is less than an airflow rate corresponding to the target temperature differential, and
      adjust operation of at least one of the following components: the circulation fan and a burner assembly of a furnace, and
      wherein adjusting the operation of the at least one component is in response to an indication by a combination of the speed and torque parameters that the estimated airflow rate is less than a minimum airflow rate.

2. The HVAC system of claim 1, wherein the controller is further configured to:
   deactivate the at least one component in response to the indication by the combination of the speed and torque parameters that the estimated airflow rate is less than the minimum airflow rate.

3. The HVAC system of claim 1, wherein the controller configured to adjust operation of the at least one component is further configured to adjust the airflow rate to at least one comfort zone of a conditioned space.

4. The HVAC system of claim 1, wherein the controller is further configured to:
   operate the motor at a speed and a torque that corresponds to a target rate of the conditioned airflow, and
   increase the torque of the motor in response to the two or more parameters indicating that the airflow rate is less than the target rate.

5. The HVAC system of claim 1, wherein the target temperature differential is a target temperature rise, and the airflow rate corresponding to the target temperature differential is an airflow rate corresponding to the target temperature rise, and the controller is further configured to:
operate the motor at a speed and a torque that corresponds to tlie target temperature rise of the conditioned airflow, and
increase the torque of the motor in response to the two or more parameters indicating that the airflow rate is less than the airflow rate corresponding to the target temperature rise.

6. The HVAC system of claim 1, wherein the controller is further configured to:
place the at least one component in an idle mode, wherein the idle mode prevents the at least one component from operating for a predetermined period of time.

7. The HVAC system of claim 1, wherein the controller is further configured to:
issue an alert to a user of the HVAC system in response to the indication by the combination of the speed and torque parameters that the estimated airflow rate is less than the minimum airflow rate, the alert providing an indication that a path of the conditioned airflow is clogged.

8. The HVAC system of claim 1, wherein the minimum airflow rate is predefined.

9. The HVAC system of claim 1, wherein the at least one component is the circulation fan.

10. The HVAC system of claim 1, wherein the at least one component is the burner assembly, and the HVAC system further comprises the furnace, the furnace including:
the burner assembly configured to combust fuel and air to produce combustion gases;
wherein the heat exchanger is configured to receive the combustion gases along a flow path extending through the heat exchanger.

11. A method for operating a heating, ventilation, and air conditioning (HVAC) system, the method comprising:
operating a circulation fan to circulate air across an external surface of a heat exchanger to produce a conditioned airflow;
estimating an airflow rate of the conditioned airflow based on two or more parameters of a motor of the circulation fan, wherein at least one of the two or more parameters is indicative of a speed of the motor and at least another of the two or more parameters is indicative of a torque of the motor;
operating the motor at a speed and a torque that corresponds to a target temperature differential of the conditioned airflow;
increasing one of either the speed or torque of the motor in response to the two or more parameters indicating that the airflow rate is less than an airflow rate corresponding to the target temperature differential; and
adjusting operation of at least one of the following components: the circulation fan and a burner assembly of a furnace, wherein adjusting the operation of the at least one component is in response to an indication by a combination of the speed and torque parameters that the estimated airflow rate is less than a minimum airflow rate.

12. The method of claim 11, further comprising:
deactivating the at least one component in response to the indication by the combination of the speed and torque parameters that the estimated airflow rate is less than the minimum airflow rate.

13. The method of claim 11, wherein adjusting operation of the at least one component includes adjusting the airflow rate to at least one comfort zone of a conditioned space.

14. The method of claim 11, further comprising:
operating the motor at a speed and a torque that corresponds to a target rate of the conditioned airflow, and
increasing the torque of the motor in response to the two or more parameters indicating that the airflow rate is less than the target rate.

15. The method of claim 11, wherein the target temperature differential is a target temperature rise, and the airflow rate corresponding to the target temperature differential is an airflow rate corresponding to the target temperature rise, and the method further comprising:
operating the motor at a speed and a torque that corresponds to the target temperature rise of the conditioned airflow, and
increasing the torque of the motor in response to the two or more parameters indicating that the airflow rate is less than the airflow rate corresponding to the target temperature rise.

16. The method of claim 11, further comprising:
placing the at least one component in an idle mode, wherein the idle mode prevents the at least one component in an idle mode from operating for a predetermined period of time.

17. The method of claim 11, further comprising:
issuing an alert to a user of the HVAC system in response to the indication by the combination of the speed and torque parameters that the estimated airflow rate is less than the minimum airflow rate, the alert providing an indication that a path of the conditioned airflow is clogged.

18. The method of claim 11, wherein the minimum airflow rate is predefined.

19. The method of claim 11, wherein the at least one component is the circulation fan.

20. The method of claim 11, wherein the at least one component is the burner assembly.

* * * * *